Patented Aug. 27, 1946

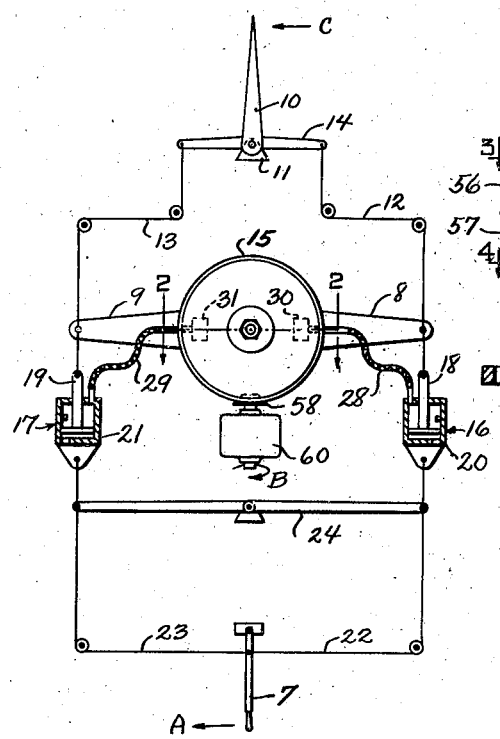

2,406,356

UNITED STATES PATENT OFFICE 2,406,356

ROTARY ELECTRICAL BOOST DEVICE FOR REDUCING CONTROL FORCES ON AIRPLANES

Jess S. W. Davidsen, Mountain View, Calif.

Application June 16, 1942, Serial No. 447,270

3 Claims. (Cl. 244—83)

(Granted under the act of March 3, 1883, as amended April 30, 1928; 370 O. G. 757)

This invention relates to control systems for aircraft and more particularly to a booster control system for aircraft similar to the booster control system described and claimed in my copending application, Serial No. 417,433, filed November 1, 1941.

It is recognized by those skilled in the art relating to aircraft controls to whom this specification is particularly addressed that hydraulically actuated control devices have certain inherent objections when used at extremely high altitudes. This is due to the fact that the low temperatures there encountered cause the fluid viscosity to increase to such an extent that the hydraulically actuated boost devices either become inoperative, or extremely sluggish in their operation. The regions of today's military operations require booster devices which will be uneffected by the low temperature encountered at these extreme altitudes. The prior art shows that the limitations on these hydraulically actuated devices have been acknowledged. The general solution of the particular problem involved has been an attempt to design a hydraulically actuated device which may be "shut off" or rendered inoperative, and one which, when made inoperative, offers no additional loads to the pilot. Thus the low temperatures and high viscosity encountered at high altitudes have necessitated shutting off the boost system. My copending application to which reference has been made above is concerned with such a proposition. Notwithstanding the fact that I believe the subject matter of my copending application to be a satisfactory solution in this regard, it is my purpose here to present a control device which will be unaffected by low temperatures, thereby avoiding the present necessity of shutting off the booster system at these low temperatures thereby also avoiding the present necessity of requiring the pilot to handle the full control surface loads. To accomplish this purpose I propose to provide a servo-booster device which in its preferred form utilizes electrical energy to supply the necessary assisting force.

It is an object of this invention to provide a novel booster control system for aircraft, the operation of which is unaffected by low temperatures, and as in the system described in my copending application offers no additional loads to the pilot when shut off or rendered inoperative; and which exerts an assisting force proportional to the pilot's manual effort.

It is also an object to provide a booster control system which will assure that the changes in control reaction will be felt by the pilot to a high degree of fidelity.

It is a further object of this invention to provide a control device which when not in use, or when rendered inoperative, will still function to impose a snubbing action against suddenly applied external loads such as those which frequently result from gusts or rough air; and to perform the snubbing action without loss of "feel" or pilot reaction.

From the standpoint of military vulnerability, the electric powered boost device has an advantage over the strictly hydraulic type in that the electric energy can be delivered to the motor through a plurality of parallel power leads, thus a number of the leads may be severed without affecting the operation of the device, whereas the strictly hydraulic type is rendered inoperative once its supply line is punctured. It is also recognized that a further simplification from the standpoint of military vulnerability or other considerations can be affected by the substitution of an air turbine in place of an electric motor to furnish energy for the rotary boost device. The pressure head required to operate the turbine would, of course, be the impact pressure created by the movement of the aircraft relative to its flight sustaining medium, and the initial source of energy would be the motor or motors propelling the craft. Energy is actually stored in the rotating system by reason of its inertia and the fact that the imposed boost loads are of an intermittent nature.

It is a further object of this invention, therefore, to provide a booster control system for aircraft which utilizes the kinetic energy of a rotating inertia member to apply a variable and intermittent booster force to aid in positioning the control surface of an aircraft.

Other objects and advantages will become apparent from the specification as the specific features of certain preferred modifications of this invention are hereinafter described in detail in connection with the accompanying drawing, in which Fig. 1 is a schematic view of the control mechanism of this invention;

Fig. 2 is an elevational view in cross-section of the rotary power transmitting system, and friction means for transmitting the torque thereof on to said control surface;

Fig. 3 is a cross-sectional plan view taken on line 3—3 of Fig. 2;

Fig. 4 is a cross-sectional plan view taken on line 4—4 of Fig. 2;

Fig. 5 is a schematic view of a modification illustrating a push-pull system of control; and Fig. 6 is a partial schematic view of a modification wherein an air turbine is utilized to provide a rotary torque to said power transmitting system.

Referring now to the drawing and particularly to Fig. 1 wherein I have illustrated a preferred embodiment of this invention in which reference numeral 10 designates a control surface of an aircraft. This control surface 10 which may be either an aileron, elevator or rudder is pivoted to its supporting structure 11 and positioned about this pivot by means of a force transmitting system which includes the cables 12 and 13. One end of each of these cables is secured to the control horn 14 at its opposite ends and is connected intermediate its ends to the opposite ends of the protruding arms 8 and 9 respectively of the pivoted force transmitting member 15. The other end of each of the cables 12 and 13 is securely fastened to its respective piston 18 and 19 of the fluid coupling members indicated generally on the drawing at 16 and 17. Each of these fluid couplings includes a fluid-tight cylindrical chamber 20 and 21 enclosing its respective piston 18 and 19 so as to provide a fluid-tight space for a low viscous liquid such as kerosene. The pivoted control column 7 is connected by means of the cables 22 and 23 to the cylinders 20 and 21 of the fluid couplings. The cable is secured to opposite ends of the pivoted spreader bar 24 intermediate its ends so as to permit any initial rigging tension to be applied at the cable without affecting the fluid pressure within the couplings 16 and 17.

Flexible fluid pressure hose 28 and 29 lead from the interior of each of the fluid couplings 16 and 17 to the fluid brake cylinders 30 and 31, respectively. As illustrated in Figs. 3 and 4, each of these movable fluid brake cylinders 30 and 31 contain a pair of oppositely movable pistons. The cylinder 30 contains the pistons 32 and 34 whereas the cylinder 31 contains the movable pistons 33 and 35. As shown in Fig. 3, each of these pistons 32 and 34 are secured to the free ends 36 and 37 of the pivoted and arcuate-shaped brake shoes 38 and 39, whereas the pistons 33 and 35, as shown in Fig. 4, are secured to the free ends 40 and 41 of the pivoted and arcuate brake shoes 42 and 43. The outer surface of each of these brake shoes 38 and 39 and 42 and 43 are covered with a suitable brake lining indicated in the drawing as 44. The brake shoes 38 and 39 are pivotally secured to the friction brake supporting member 45 at 46, whereas the brake shoes 42 and 43 are pivotally secured to the friction brake supporting member 47 at 48. These brake supporting members 45 and 47 also support the brake cylinders 30 and 31 and are each keyed to the spindle portion 49 of the torque transmitting member 15 in a manner to be hereinafter more particularly described. The coiled tension springs 50 and 51 retain their respective brake shoes 38 and 39 and 42 and 43 in the position illustrated wherein the respective pistons 32 and 34 and 33 and 35 are each directed inwardly in their respective cylinders 30 and 31.

A pair of brake drums or rotatable members 52 and 53 are supported for rotation on the spindle portion 49 of the torque transmitting member 15 so that flange surfaces 54 and 55, respectively, overlie the brake lining 44 formed on the brake arms 38 and 39 and 42 and 43. The outer edge of each of these flange surfaces 54 and 55 of the brake drums 52 and 53 are each provided with a beveled ring gear 56 and 57 which meshes with the beveled gear 58 shown splined on the shaft of the motor 60. Rotation of the motor 60, therefore, produces rotation of the brake drums 52 and 53 in opposite directions as indicated on the drawing by the arrows.

As stated previously, the brake arm supporting members 45 and 47 are each secured to the spindle portion 49 of the torque transmitting member 15 by means of a key 59. The keyway or key slot formed in each of the supporting members has an arcuate extension $2\alpha°$. This key slot permits relative movement of each supporting member and its torque transmitting member through an angle of $2\alpha°$. The lugs 62 and 63 are provided on each of the supporting members and a tension spring 64 is secured to each lug so as to keep the two supporting members 45 and 47 in the position illustrated in the drawing wherein the key 59 engages opposite ends of the key slots 66 and 67.

The operation of the device, as schematically illustrated in Fig. 1, is as follows:

As illustrated in Fig. 1, motor 60 is presumed to be rotating in the direction indicated by the arrow B to provide for rotation of the drum 52 in a clockwise direction when viewed from above and to provide for rotation of the drum 53 in an opposite or counter-clockwise direction as viewed from above by means of beveled gears 56, 57 and 58. When the operator moves the control column or stick 7 of Fig. 1 in the direction shown by arrow A, tension is supplied to the cables 22 and 12. This tension creates a pressure on the fluid in the fluid coupling 16, which is transmitted by the flexible hose 28 to the friction brake cylinder 30. The pressure transmitted to the cylinder 30 acts upon the pistons 32 and 34 to move the brake shoes 38 and 39 and expand the friction lining 44 against the inner surface of the flange 54 of the drum 52 which is rotating in a clockwise direction. The friction between the brake band 44 and the drum 52 tends to cause the brake band 44 to rotate with the drum 52 in a clockwise direction. The torque thus absorbed by the brake band 44 is transmitted through the brake supporting member 45 and the key 59 to the spindle 49 and tends to move the torque transmitting member 15 about its pivot. The motion thus transmitted to the member 15 tends to move the control surface 10 by transmitting the torque applied thereto to the control horn 14 through the force transmission cable 12.

At the time that the brake shoes 38 and 39 were expanded into frictional engagement with the rotating drum 52, the brake shoes 42 and 43 were not expanded into contact with the rotating drum 53, consequently the brake supporting member 47 is free to follow the movement of the key 59 on the spindle 49 by virtue of the spring 64 which is attached between the lugs 62 and 63 formed on the friction brake supporting members 45 and 47. This spring action serves to keep the driving face of the keyways 66 and 67 against the key 59. It should be noted that the assisting force of the brake shoes 38 and 39 operates with respect to the drum 52 and can be smooth and proportional to the tension applied to the cable 22 the same as is the deceleration of an automobile equipped with hydraulic brakes smooth and proportional to the foot pressure exerted by the operator. Movement of the control stick 7 in a direction opposite to the direction indicated by the arrow A relieves the friction pressure on the drum 52 and increases the friction pressure on the drum 53, which tends to assist the control surface 10 in the opposite direction. It is intended that when no force is applied to the control stick 7 neither pair of brake shoes will be forced into contact with the drums 52 or 53. If the operator is holding the control stick 7 in a given position and fluctuations occur in the external load applied to the control surface, these fluctuations will cause the fluid pressure within the fluid couplings 16 and 17 to vary and will thus control the boost forces applied to the control surface. Of course, any variations in fluid pressure in the fluid couplings will be felt by the operator in a reduced ratio which is fixed by the design of the unit.

In the event that a boosted force is not desired, the energizing circuit of the electric motor 60 is disrupted and the driving torque producing continuous rotation of the brake drums 52 and 53 is removed. Under these conditions, which may result from a power failure, it is desirable that additional loads, beyond the normal control surface loads, should not be imposed upon the pilot or interfere in any way with the successful, ordinary positioning of the control surface. As shown in Figs. 1 and 2, arms 8 and 9 of the torque transmitting member 15 are secured to the control cables 12 and 13 and in all cases move with the cables. As it was initially proposed that the operator move the control stick in the direction indicated by the arrow A, the applied force goes to the fluid coupling 16 increasing the fluid pressure therein and also pulls directly on the cable 12 and control horn 14 tending to move the control surface 10. The increase in fluid pressure at 16 if the applied force is sufficient will be transmitted to the brake cylinder 30 causing the brake shoes 38 and 39 to move forcing the brake lining 44 into frictional engagement with the inner surface of the flange 54 on the brake drum 52 thus locking the brake drum 52 to the brake supporting member 45. The lug 62 which is secured to the brake supporting member 45 can not move because of the frictional engagement between the supporting member and the inoperative brake drum 52. However, the brake shoes 42 and 43 are controlled by the fluid pressure within the fluid coupling 17 which is not under pressure and hence these brake shoes will not be forced into frictional engagement with the interior surface 55 of the brake drum 53. Therefore, in moving the control column 7 in the direction A, the spindle 49 of the torque transmitting member 15 will be moved in a clockwise direction and is free to so move with respect to the brake drum 52 and brake arms 38 and 39 by reason of the arcuate-shaped key slot 66 of $2\alpha°$. The fluid in the brake cylinder 31 is not under pressure and the brake bands 42 and 43 are not forced into frictional engagement with the brake drum 53, therefore, this drum 53 is free to rotate relative to the brake arms 42 and 43. Since the key 59 is retained against the edge of the slot, clockwise rotation of the torque transmitting arm 15 will cause the friction brake supporting member 47 to move with the spindle 49 and the operator has to overcome only the small tensional force of the spring 64 to move the control surface to the new position.

The reason that the key slots in the frictional band supporting members 45 and 47 have an arcuate extension of $2\alpha°$ is primarily precautionary, since the angle $\alpha$ is intended to be equivalent to the full movement of the spindle 49 and the pivoted torque transmitting member 15 from its neutral position. The circumstances might be such, however, as to require the pilot to move the control surface 10 from its extreme limit of deflection in one position to the extreme limit of its deflection in the other direction; in which event, the spindle 49 of the arm 15 would be required to move through an angle of $2\alpha°$ with respect to the locked friction shoes or brake supporting member.

Exterior loads which are suddenly applied to the control surface produce pilot fatigue and are undesirable from the standpoint of control system structure. These suddenly applied loads frequently arise from gusts or from rough air. In the modification of my invention which I have illustrated in Figs. 1 and 2, it may be assumed that a force produced by a gust of wind is suddenly applied to the control surface in the direction indicated by the arrow C and the operator resists movement of the control surface in said direction by applying a manual force to the control stick 7 in the direction indicated by the arrow A. The pressure in the fluid coupling 16 is thus increased and tends to lock the friction bands 44 of the brake shoes 38 and 39 against the inner flange surface of the brake drum 52. This brake drum is geared to the inoperative electric motor 60. Thus, the shock load transmitted by the cable 12 to the spindle 49 of the torque transmitting member 15 when applied by the key 59 in a counter-clockwise direction against the friction brake supporting member 45 is snubbed against the inertia of the electric motor. A small control force applied to the cable 22 is all that is necessary to produce the snubbing action. While the inertia of the motor 60 serves as a snubber, it is apparent that if the control surface were actually moved by these exteriorly applied forces, cable 22 would have to carry the whole load existing on cable 12.

Fig. 5 discloses a modification of this invention wherein a push-pull system of control is used. A single force transmitting element 70, which is illustrated as a Bowden wire, delivers the push-pull pressure transmitted to the control stick 7′ by the operator on to the control horn 14′ through the fluid coupling 71. This fluid coupling member consists of a centrally disposed piston 72 which is connected by means of the control rod 73 to the control horn 14′. The cylinder 74 surrounds this piston 72 forming therewith the fluid-tight chambers 75 and 76 on either side thereof. One end of the Bowden wire 70 is secured to the cylinder so that the application of manually applied force to the control stick 7′ will be transmitted by the Bowden wire 70 through the fluid within the chambers 75 and 76 into the brake cylinders 30 and 31. The flexible hose 77 and 78 connect the outlet passages leading from the fluid-tight chambers 75 and 76 to the opposite sides of the piston of the brake cylinders 30 and 31, respectively. The control rod 73 is connected intermediate the ends of the arm 9′ of the pivoted torque transmitting member 15 and is movable in the slot 79 of the torque transmitting arm as this arm moves about the fixed shaft 6′. The torque transmitting mechanism, schematically illustrated in this modification, is similar in all respects to that illustrated in Fig. 2 and similar reference numerals have been used to indicate their parts.

The modification of the invention illustrated in Fig. 6 shows the application of an air turbine 80 for transmitting a rotation force to the two brake drums 52′ and 53′. It is intended that the motion of travel of the pistons 18 and 19 of the fluid couplings 16 and 17 will be very small in going from an initial to a maximum pressure. This motion may be limited by providing stops on the inner surface of the cylinder, as illustrated, which serve to transmit the forces applied to the control column 7 on to the control horn 14, in the event of loss of fluid within the fluid couplings. In the modifications illustrated, the ratio of the total force including the assisting force plus the manual force as transmitted to the control surface 10 by either of the cables 12 or 13, to the manually applied force to the cables 22 or 23 is not variable by the operator as it is in the copending application but is on the contrary fixed by the particular design. It should be apparent, however, that suitable mechanical linkages could be supplied which would give a variable ratio of the forces involved similar to those obtained in my copending application to which reference has been made above.

According to the provisions of the patent statutes, the preferred forms of my invention have been illustrated and described with the understanding, however, that the devices are illustrated in their simplest form for the purposes of clarity and it is intended that many variations in the design may be made without departing from the scope of this invention. As a specific example, a fluid pressure switch could be installed which would energize the motor only when the initial fluid pressure in the couplings had risen to a certain desired value. Thus, the motor would run only when torque was desired. It is also apparent that the small beveled gear can be connected to the motor by means of a uni-directional clutch so that the motor would deliver torque in only one direction. This would permit the brake supporting unit to be connected directly to the spindle 49 of the torque transmitting member 15. With this arrangement, it would be necessary to rotate the drums 52 and 53 as well as the small beveled gear in the event of failure of the power system. It is also apparent that a single drum could be rotated by an electric motor, the direction of rotation of which would be controlled by the individual fluid couplings, particularly if the torque were to be transmitted to the spindle 49 through friction discs because the friction discs work equally well in either direction whereas the brake bands disclosed, operate better in the manner illustrated. The disc type of clutch unit may be preferred under certain circumstances to the type illustrated in the drawing since an inherent advantage of the disc is that they are practically free from grabbing actions in changing atmosphere conditions, thus assuring smooth uniform assistance. The particular disc type of clutch to which I have referred are well known to the art and are used as brakes on aircraft. The invention herein disclosed may thus be practiced otherwise than specifically described or illustrated and still remain within the scope of the appended claims.

The invention described herein may be manufactured and used by and for the Government of the United States of America for governmental purposes without the payment of any royalties thereon or therefor.

I claim:

1. In a device for supplying an assisting force to aid in positioning a control surface of an aircraft, the combination comprising, manually actuated means for transmitting a manual force to said control surface to effect motion thereof, a spindle, a key carried by said spindle, means connecting said spindle in said manual force-transmitting means to supply said assisting force upon rotation of said spindle, a pair of drums mounted to rotate on said spindle, means for rotating said drums in opposite directions, a plate member for each of said drums, each said plate member including an arcuately-shaped keyway for cooperation with said key, said keyways extending in opposite directions from said key, means carried by each of said plate members to frictionally couple it to the drum member associated therewith, resilient means interconnecting said plate members in such manner as to hold the driving face of each of said keyways against said key, and means connected in said manual force transmitting means for actuating said friction coupling means.

2. In a device for supplying a boost force to aid in positioning the control surface of an aircraft, the combination comprising, manually actuated means for transmitting a manual force to said control surface to effect motion thereof, fluid coupling means included in said manually actuated means, a spindle, a key carried by said spindle, means connecting said spindle in said manual force transmitting means to supply said boost force to said control surface upon rotation of said spindle, a pair of drums mounted to rotate on said spindle, means for rotating said drums in opposite directions, a plate member for each of said drums, each said plate member including an arcuately-shaped keyway for cooperation with said key, said keyways extending in opposite directions from said key, means carried by each of said plate members to frictionally couple it to the drum member associated therewith, resilient means interconnecting said plate members in such manner as to hold the driving face of the keyways in said plate members against said key, fluid motor means for actuating said friction coupling means, and conduit means connecting said fluid motor means to said fluid coupling means.

3. In a device for supplying an assisting force to aid in positioning a control surface of an aircraft, the combination of a pivoted control surface, means for transmitting a manual force to actuate said control surface, a piston and cylinder interposed in said force transmitting means, a spindle, a key carried thereby, an arm secured to said spindle, means connecting said arm in said force transmitting means to supply said assisting force to said control surface, a pair of drums rotatably mounted on said spindle, means for rotating said drums in opposite directions, a plate member for each of said drums, said plate members being journaled on said spindle, a keyway in each of said plate members wider than the key carried by said spindle means connecting said plate members in such manner as to hold the driving face of the keyways therein against said key, means carried by each of said plate members for frictionally coupling said drum members thereto, hydraulic means to actuate said coupling means and conduit means connecting said hydraulic means to said cylinder, whereby upon application of manual force the increased pressure in said cylinder will cause said hydraulic means to actuate said frictional coupling means to thereby transmit a portion of the inertia of one of said rotating drums into said force transmitting means through its associated plate member, spindle and arm to supply said assisting force.

JESS S. W. DAVIDSEN.